United States Patent [19]

Morgan et al.

[11] Patent Number: 6,105,145
[45] Date of Patent: Aug. 15, 2000

[54] SYSTEM AND METHOD FOR GENERATING HIGH RESOLUTION CLOCKTICKS IN A COMPUTER SYSTEM

[75] Inventors: Milton E. Morgan; Claire P. Liboiron, both of Strongsville, Ohio

[73] Assignee: Masterpiece Software, Ltd., Aurora, Ohio

[21] Appl. No.: 08/807,582

[22] Filed: Feb. 27, 1997

[51] Int. Cl.[7] ................................................ G06F 1/04
[52] U.S. Cl. .................................... 713/501; 713/503
[58] Field of Search .............................. 395/555, 556, 395/557, 558, 559; 713/500, 501, 502, 503, 600

[56] References Cited

U.S. PATENT DOCUMENTS 5,297,275  3/1994  Thayer ..................................... 395/555
5,452,435  9/1995  Malouf et al. ........................... 395/555
5,491,814  2/1996  Yee et al. ................................. 395/550
5,526,515  6/1996  Ross et al. ............................... 395/550
5,542,071  7/1996  Maupin et al. .......................... 395/500

*Primary Examiner*—Dennis M. Butler
*Attorney, Agent, or Firm*—Calfee, Halter & Griswold

[57] ABSTRACT

A system and method is provided by the present invention for transmitting or receiving data to or from a computer system by reprogramming the computer system's clock. The invention provides an executive processor which interfaces to an operating system and initiates a reprogramming of the clock upon an occurrence of a predetermined condition. The reprogramming of the system clock includes a method for determining a resolution constant which is used to generate a clock counter value. The method of determining the resolution constant includes methods of determining CPU interrupt latency CPU index speed, computer system UART baud rate.

19 Claims, 10 Drawing Sheets

SYSTEM AND METHOD FOR GENERATING HIGH RESOLUTION CLOCKTICKS IN A COMPUTER SYSTEM

FIELD OF THE INVENTION

The invention relates generally to computer system devices, and, more particularly, to a method for generating clock interrupt handlers in computer systems. The invention further relates to a method of managing a plurality of interrupts in a computer system.

BACKGROUND OF THE INVENTION

Personal computer systems are well known in the art. Personal computer systems have attained wide-spread use for providing computer power to many segments of today's modern society. Personal computers can typically be defined as a desktop, floor standing, or portable, and comprised of a system unit having a single central processing unit (CPU) and associated volatile and non-volatile memory, including all RAM and BIOS ROM, a system monitor, a keyboard, one or more flexible diskette drives, a fixed disk storage drive (also known as a "hard drive"), a so-called "mouse" pointing device, CD-ROM drive and, optionally, a fax/modem and printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's PERSONAL COMPUTER AT (IBM PC/AT) and later, more advanced, descendants made by DELL, COMPAQ and others. These computer systems are collectively referred to as PC's.

Personal computer systems are typically used to run software to perform such diverse activities as word processing, manipulation of data via spread-sheets, collection and relation of data in databases, displays of graphics, design of electrical or mechanical systems using system-design software, etc. The proliferation of the Internet, and other on-line communication services, has placed additional demands on personal computer systems and the networks with which they communicate.

A personal computer system user typically accesses the Internet, or other on-line network provider, through a fax/modem device that connects the user's personal computer system to the on-line network's host network. The fax/modem device is generally connected to a regular telephone line, also know as Plain-Old-Telephone-Service (POTS), and dials a telephone number which is associated with an on-line provider or, if sending a facsimile, a fax machine or another computer system with a fax/modem. Because POTS lines are analog in nature, they have limited bandwidth. The term "bandwidth" is Generally used to describe the frequency range of transmission and/or reception of a device and when used in connection with communication devices such as fax/modems, is typically measured in terms of baud rates. A "baud" is measured as one bit per second. (hereinafter bps). POTS lines generally have an upper transmission limit of 33.6 kbps (kilobits per second). As an alternative to the POTS line, most telephone companies offer an Integrated Digital Services Network (ISDN) line. Because ISDN lines are "digital" in nature, their transmission rates are significantly greater than a POTS line. A typical ISDN line offers transmission rates of 128 kbps for data and 16 kbps for signaling and control.

Once a user is connected to an on-line provider, the user may perform a variety of functions, such as, browsing homepages, uploading and downloading files from remote network sites. Additionally, when users are not using their personal computer system's to connect to these on-line services, they are increasingly using their systems to send and receive facsimiles through the fax/modem device. However, functions such as these tend to create what is known as a communication "bottleneck" il a user's personal computer system. A communication "bottleneck" is created because the user is prohibited from using the system or executing other functions when the system is performing certain operations. One typical example of this communication "bottleneck" is WINDOWS 3.1's and WINDOWS '95's use of an "hourglass" pointer icon to indicate to the user that the system is busy and cannot be directly controlled by the user. In such a case, the user must wait until the system completes its task and returns control to the user by changing the "hourglass" icon back to an "arrow" icon. The above described phenomena is further described as "lost use" of the personal computer system since the user cannot use the system during this period.

A second, associated problem with communication "bottleneck," is known as "FAX-failure." "FAX-failure" occurs when a personal computer system is busy for long periods of time and fails to communicate with a second device to which communication was originally established. The failure of communication causes the second device to assume that the personal computer system has failed or ended the communication and therefore the second device will also end the communication. One example of "FAX-failure" is when, in an intranet or LAN communications network, large raster image information or files (megabytes in size) are required to be sent to a local plotter or printer. In such a situation, the computer system may be occupied for over an hour in the generation of the required raster file information and therefore not communicate with the printer or plotter device during this period. This non-communication will cause the network to assume that the connection between the computer system and the plotter or printer has failed due the absence of control or data transmission in the connection and the connection will be lost.

To further understand how the phenomena's of communication "bottleneck" and "FAX-failure" arise, a review of how a computer system communicates with its peripheral devices, such as a fax/modem, is useful. There are two general methods by which a computer system collects information from its peripheral devices: (1) Polling and (2) Hardware Interrupts. In Polling, the peripheral device is regularly examined to determine whether information is available for the central processing unit to process. The primary disadvantage of this method is that the central processing unit is pre-occupied with the polling process which causes the execution of foreground programs to proceed slowly. Additionally, polling routines must be incorporated into the program running and thus requires more code. Moreover, if the polling period is too long, information at the peripheral device may be lost due to replacement by more recent information.

The second method by which a computer system collects information from its peripheral devices is via the use of hardware interrupts. This method is more properly known as Interrupt-Driven Data Exchange (IDDE). In IDDE, the peripheral device causes an interrupt, or IRQ, signal to be generated that informs the central processor that information has been received from the peripheral device and is ready for processing. As compared to Polling, IDDE does not require periodic examination of the peripheral device. Accordingly, the foreground program(s) will execute with greater performance because the central processing unit is not occupied with polling of the peripheral device. However, the full potential of IDDE has yet to be fully realized.

Additionally, during these and other "bottleneck" conditions, users experience a wide range of computer system performance problems from "herky-jerky" foreground performance to data overruns to "network busy" disconnections. Typically, the "herky-jerky" performance occurs when there is a background upload and download file transfer activity. The "bottleneck" causing data overrun occurs in the computer system because the system's software is not retrieving data from its modem device at a speed (i.e. baud rate) that is equal to the speed at which the modem device is receiving the transmitted data from the transmitting or sending device.

Most modem devices are equipped to handle the storage of a limited amount of data in its own buffer. However, when the modem device's buffer is filled to capacity and the computer system's UART (Universal Asynchronous Receiver Transmitter) buffer has not been emptied while additional data is received from the transmitting modem device a condition called data "overrun" occurs. When data "overrun" occurs, the receiving) modem device must notify the transmitting modem device to retransmit the already transmitted data when it has available buffer space. Therefore, this condition results in the transmission of certain data more than once.

A "network busy" problem occurs because the flow of data through the network is not monitored in a dynamic fashion. In particular, some networks do not distinguish nodes requiring service from nodes not requiring service. Therefore, conditions may occur wherein the network is not servicing those nodes which require service because the network has allocated resources to nodes which do not require service.

Accordingly, the present invention is directed to reducing the communications "bottleneck" and the associated problem of "FAX-failure." By reducing the communications "bottleneck" and the associated problem of "FAX-failure," users can regain "lost use" of their personal computer systems which occurs, for example, during file transfers and other situations, discussed supra. Moreover, by reducing the communications "bottleneck" and "FAX-failure," a user can more efficiently employ a POTS line because the user's personal computer system will run closer to its designed hardware limits.

SUMMARY OF THE INVENTION

According to the present invention, a system and method are provided for transmitting or receiving data to or from a computer. The method includes the steps of reconfiguring a clock to generate clockticks at a frequency which is based upon a computer's particular hardware structure upon the initiation of a transmission or reception of data to or from the computer and transmitting or receiving data based on the clocktick frequency. The step of reconfiguring a clock to generate clockticks at a frequency which is based upon a computer's particular hardware structure upon the initiation of a transmission or reception of data to or from the computer includes the steps of determining a resolution constant and generating a clock counter value which is based on the resolution constant.

The step of determining a resolution constant includes the steps of determining a CPU index that indicates the speed of a CPU relative to a predetermined value, an interrupt latency factor that indicates the delay between when an interrupt is issued to a CPU and when an operation which is supposed to process the hardware interrupt is initiated, a UART baud rate that indicates the data transmission and reception settings of the UART and/or a safety factor. The step of determining a CPU index that indicates the speed of a CPU relative to a predetermined value includes the steps of: upon the occurrence of a first clocktick, initiating the execution of a test process and counting the number of clockticks that have occurred subsequent to the occurrence of the first clocktick and during the execution of the test process.

The present invention also provides a method of transmitting or receiving data between components of a computer system. The method having the steps of reconfiguring a clock to generate clockticks at a frequency which is based upon the components' data transmission and reception rates upon the execution of a data transmission or reception instruction, and transmitting, or receiving data between the components based on the clocktick frequency. The step of reconfiguring a clock to generate clockticks at a frequency which is based upon the components' data transmission and reception rates upon the execution of a data transmission or reception instruction includes the steps of determining a resolution constant and generating a clock counter value which is based on the resolution constant.

The step of determining a resolution constant includes the steps of determining a CPU index that indicates the speed of a CPU relative to a predetermined value, an interrupt latency factor that indicates the delay between when an interrupt is issued to a CPU and when an operation which is supposed to process the hardware interrupt is initiated, the components' data transmission and reception rates and/or a safety factor. The step of determining a CPU index that indicates the speed of a CPU relative to a predetermined value includes the steps of: upon the occurrence of a first clocktick, initiating the execution of a test process and counting the number of clockticks that have occurred subsequent to the occurrence of the first clocktick and during the execution of the test process.

The present invention also provides a computer system having a hardware structure and logic for reconfiguring a programmable clock to generate clockticks at a frequency which is based upon the computer system hardware structure and wherein the reconfiguration is initiated upon a transmission or reception of data within the computer system. The hardware structure includes a CPU, input/output devices for receiving and transmitting data, and the programmable clock for generating a clock frequency by which the computer system operates.

The logic for reconfiguring the programmable clock to generate clockticks at a frequency which is based upon the computer system hardware structure and wherein the reconfiguration is initiated upon a transmission or reception of data within the computer system includes logic for determining a resolution constant and clock counter value. The logic determining a resolution constant includes logic for determining a CPU index that indicates the speed of a CPU relative to a predetermined value, logic for determining an interrupt latency factor that indicates the delay between when an interrupt is issued to a CPU and when an operation which is supposed to process the hardware interrupt is initiated and logic for determining a resolution constant based on a safety factor.

It is therefore an advantage of the present invention to provide a computer system and method which reconfigures itself to be operated at its maximum data transfer and reception rates based on the systems current hardware configuration.

It is a further advantage of this invention to provide a computer system and method which performs high speed data transfers in the form of background processes while allowing users to seamlessly access foreground processes. The system and method of the present invention thus provides computers with the ability to re-program themselves to achieve maximum data transfer and reception rates based on their hardware structure and operating states while maintaining computer system integrity by still providing the system with expected clock frequencies when necessary.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

DETAILED DESCRIPTION OF ILLUSTRATED EMBODIMENT

Figure 1:
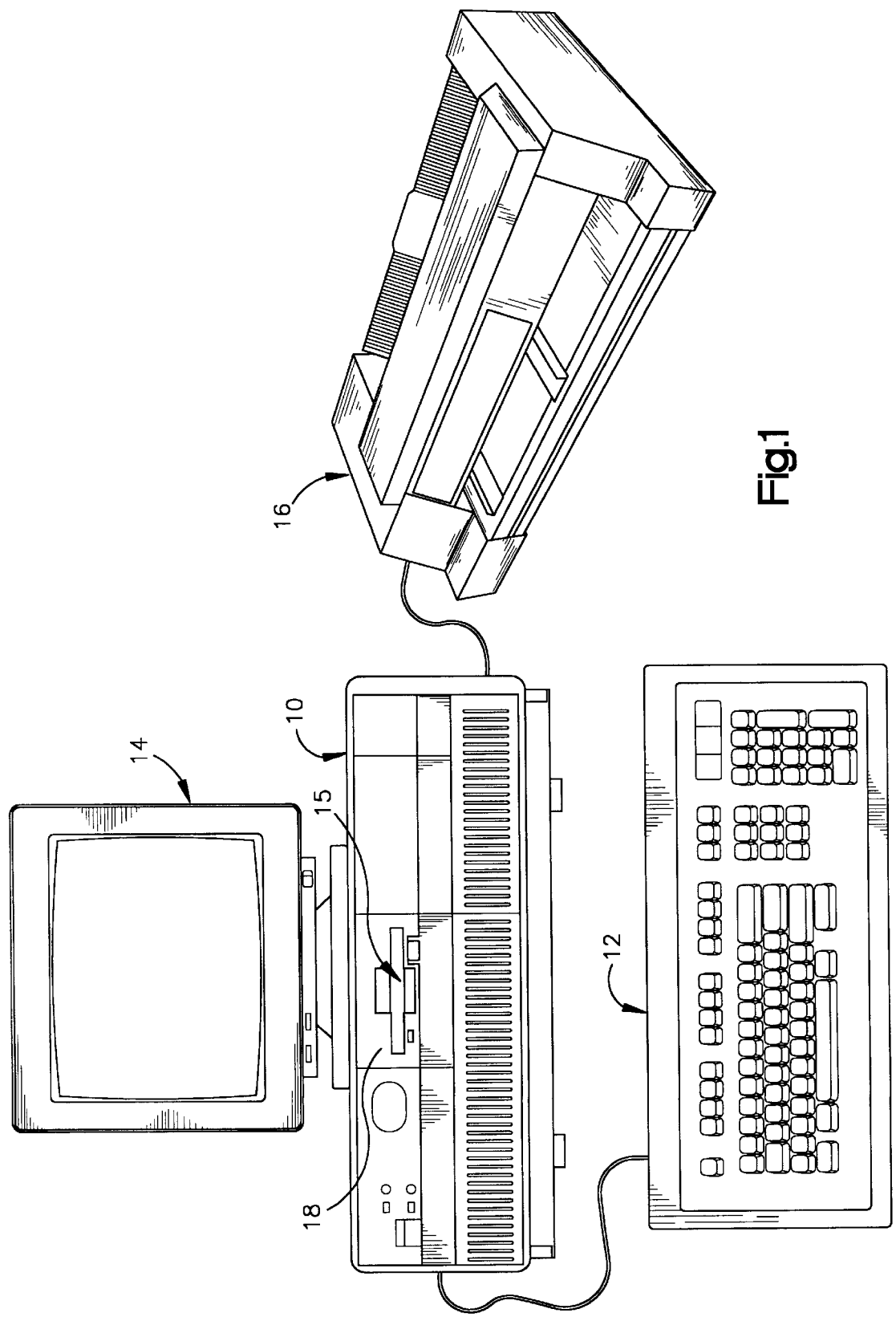
FIG. 1 is a perspective view of a personal computer incorporating the logic of the present invention for reconfiguring the programmable clock.

Referring now to the drawings, and for the present to FIG. 1, a microcomputer embodying the present invention is shown and generally indicated at 10. As mentioned hereinabove, the computer 10 may have an associated monitor 14, keyboard 12 and printer or plotter 16.

Figure 2:
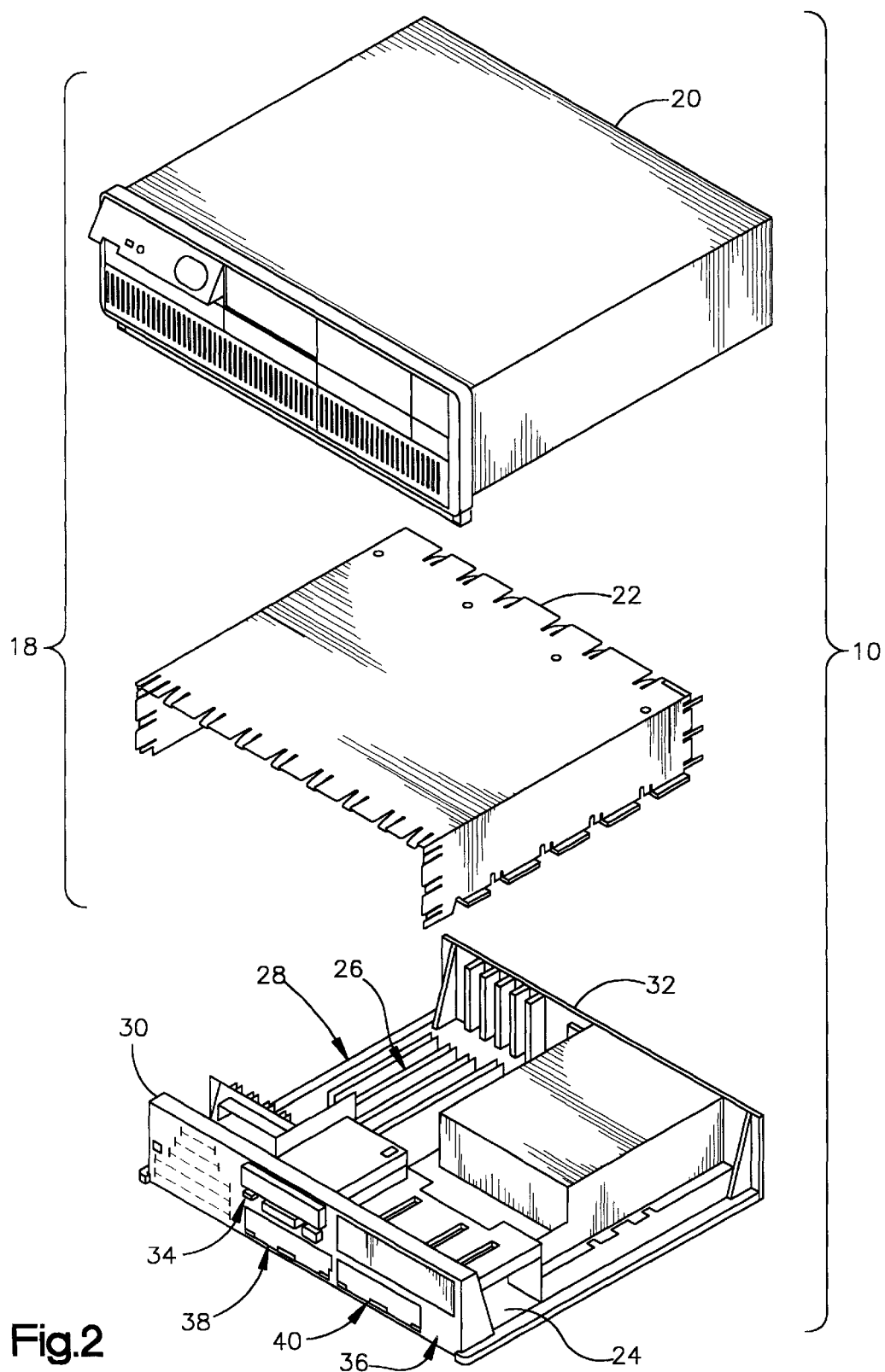
FIG. 2 is an exploded perspective view of certain elements of the personal computer of FIG. 1 including a chassis, a cover, an electromechanical direct access storage device and a planar board, illustrating certain relationships among those elements.

Referring now to FIG. 2, the computer 10 has a cover 18 formed by a decorative outer member 20 and an inner shield member 22 which cooperate with a chassis 28 in defining an enclosed, shielded volume for receiving electrically powered data processing and storage components for processing and storing digital data. At least certain of these components are mounted on a multi-layer planar board 26 or mother board which is mounted on the chassis 28 and provides a structure for electrically interconnecting the components of the computer 10 including those identified above and such other associated elements as floppy disk drives, various forms of direct access storage devices, accessory cards or boards, and the like. As pointed out more fully hereinafter, provisions are made in the planar board 26 for the passage of input/output signals to and from the operating components of the microcomputer.

Still referring to FIG. 2, the chassis 28 has a base indicated at 24, a front panel indicated at 30, and a rear panel indicated at 32. The front panel 30 defines at least one open bay (and in the form illustrated, four bays) for receiving a data storage device such as a disk drive for magnetic or optical disks, a tape backup drive, or the like. In the illustrated form, a pair of upper bays 34, 36 and a pair of lower bays 38, 40 are provided. One of the upper bays 34 is adapted to receive peripheral drives of a first size (such as those known as 3.5 inch drives) while the other bay 36 is adapted to receive drives of a selected one of two sizes (such as 3.5 and 5.25 inch, or alternatively a CD-Rom) and the lower bays are adapted to receive devices of only one size (3.5 inch). One floppy disk drive is indicated at 15 in FIG. 1, and is a removable media direct access storage device capable of receiving a diskette inserted thereinto and using the diskette to receive, store and deliver data as is generally known.

Figure 3:
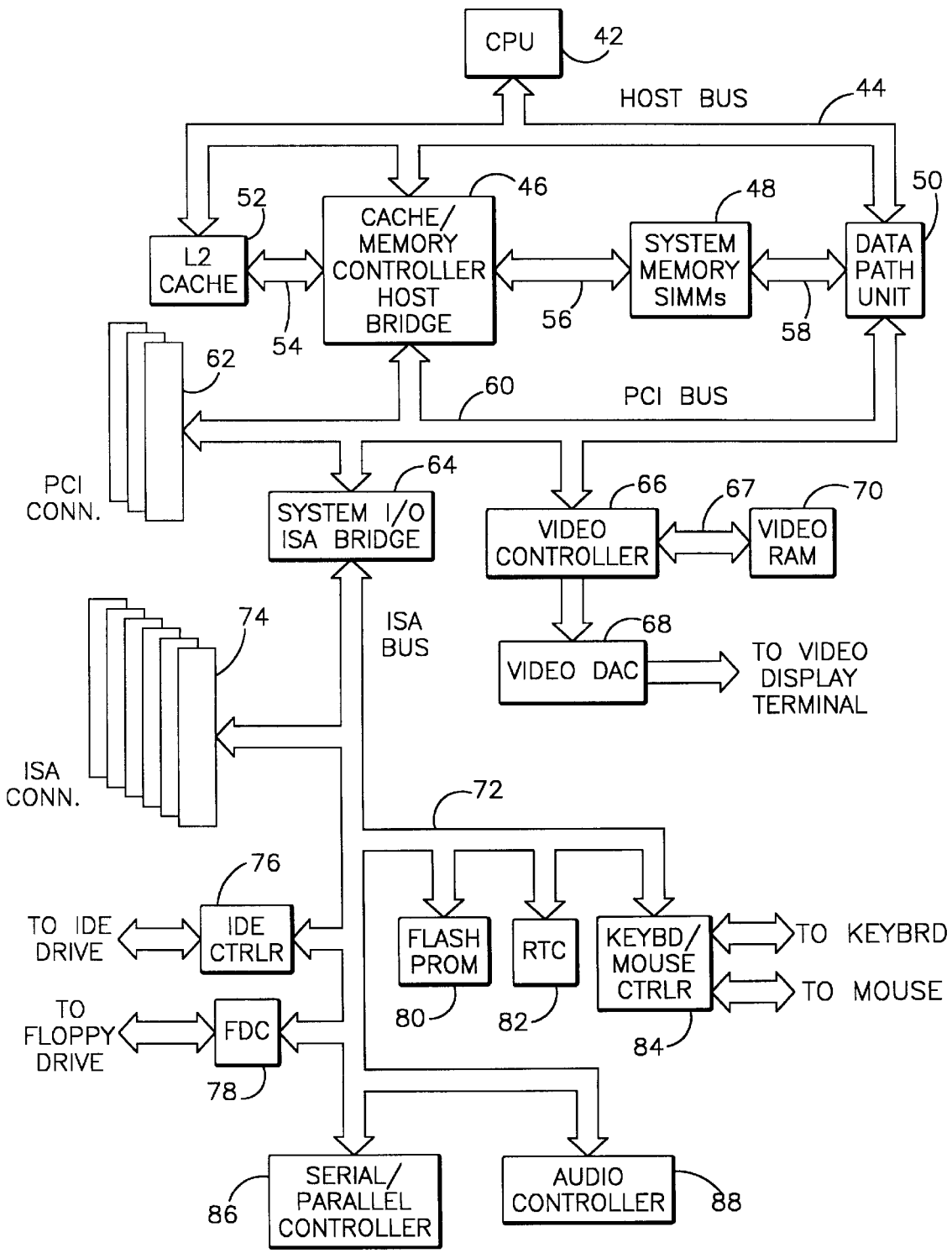
FIG. 3 is a schematic view of certain components of the personal computer of FIGS. 1 and 2.

Prior to relating the above structure to the present invention, a summary of the general operation of the personal computer system 10 merits review. Referring to FIG. 3, there is shown a block diagram of a personal computer system illustrating the various components of the computer system 10 in accordance with the present invention, including components mounted on the planar 26 and the connection of the planar to the I/O slots and other hardware of the personal computer system. Connected to the planar board 26 is the system processor 42. While any appropriate microprocessor can be used as the CPU 42, one suitable microprocessor is the PENTIUM™ processor which is sold by Intel Corp. The CPU 42 is connected by a high speed CPU host bus 44 to a cache/memory controller and host bridge 46, to data path unit 50, and to second level cache memory (L2 cache) 52. The cache/memory controller and host bridge 46 is connected to L2 cache 52 via a bus 54 and to a system memory 48 via a bus 56. The cache/memory controller and host bridge 46 integrate the cache 52 and system memory 48 control functions and provides address paths and bus controls for transfers between the Host (CPU 42), system memory 48, and a Peripheral Component Interconnect (PCI) bus 60. The PCI bus employs a 32 bit data bus that supports multiple peripheral components and add-in cards at a peak bandwidth of 132 MB/second.

During bus operations between the Host (CPU 42), main memory 48 and PCI bus 60, the cache/memory controller 46 provides the address paths and bus controls. The cache/memory controller 46 also controls data flow through the data path unit 50.

The data path unit 50 provides data path connections between the Host (CPU 42), system memory 48, and the PCI bus 60. The system memory 48 is interfaced to the data path unit 50 via a data bus 58 whereby data is transmitted into and out of the system memory 48. The cache/memory controller 46 and the data path unit 50 provide a full function data path connection to system memory 48 and from a PCI bus 60 to a Host subsystem (CPU 42).

The PCI bus 60 is further connected to a plurality of PCI bus expansion slots 62 (three slots are shown), system I/O bridge controller 64, and video controller 66. The system I/O bridge controller 64 provides a bridge between the PCI bus 60 and an ISA bus 72 (or an EISA bust not shown) and integrates many of the common I/O functions found in today's ISA (or EISA) based PC systems. The video controller 66, which is associated with a video RAM 70 for storing, graphic information via a bus 67, is connected to the PCI Bus 60 to allow large amounts of data required for high performance graphics to be transmitted quickly to the video controller 66. Video signals exchanged with the video controller 66 may be passed through a Digital to Analog Converter (DAC) 68 to a video display terminal or other display device.

Various peripheral devices are connected to the ISA bus 73, such as ISA expansion slots 74 (6 are shown), IDE hard disk controller 76, floppy disk controller (FDC) 78, flash prom (BIOS) 80, real time clock 82, keyboard/mouse controller 84, serial/parallel controller 86, and optionally an Audio controller 88. The serial/parallel controller 86 typically employs a Universal Asynchronous Receiver and Transmitter (UART) chip for serial data transfer. The UART employed in early PC's was the UART 8250. More modern PC's employ descendants of the UART 8250, such as the UART 16450 or 16550 chips (hereinafter collectively as UART chip). The UART chip allows a serial data transfer rate of up to 115,200 baud. However, most serial data exchange standards, such as RS-232C of the Electronic Industries Association, allow a transfer rate of up to 20,000 baud.

Another component of particular importance to the personal computer system 10 is a Programmable Interval Timer (hereinafter PIT). One PIT that is typically employed in personal computer systems is the 8253/8254/82C54 PIT. A PIT generates programmable time intervals from an external clock signal of a crystal oscillator (not shown) on the mother board which is defined independently from the CPU 42. The PIT employs three independent and programmable counters (0 to 2) which count down from a given value. In the personal computer system, each counter is responsible for a different task.

Specifically, counter 0 is responsible for updating the system clock. On most personal computer systems, counter 0 is programmed to provide 18.2 clockticks a second. An interrupt #08 h is generated for each $1/18.2$ of a second clocktick. Counter 1 is responsible for Dynamic Memory Access (hereinafter DMA) refreshing of Dynamic Read Only Memories (hereinafter DRAM's). By their nature. DRAM's require periodic refreshing of their memory cells in order to maintain the charges stored therein. Therefore, counter 1 clock signals are sent to the DMA controller for triggering of DMA controller refresh signals which are responsible for the refreshment of the DRAM's memory cells. Lastly, counter 2 is connected to the personal computer system speaker and is typically programmed to generate audio waveform. The audio waveform is typically a square wave.

In most personal computer systems, the three counters of the PIT are programmed to run at the same time base of 0.838 $\mu$S, or 1.193181 MHz. Each counter in the PIT decrements once for every input clock signal. The PIT therefore, by generating exactly defined time intervals through the programming of its counters, allows programmers certainty when implementing required delays in programs that can be executed on personal computers of varying CPU 42 speed.

When a peripheral device communicates with the CPU 42, it is typically through a Programmable Interrupt Controller (hereinafter PIC). In the computer system, the PIC is connected between an interrupt requesting peripheral and the CPU 42. Referring to computer system of FIG. 3, the PIC may reside, for example, in system I/O bridge controller 64 or in the cache/memory controller and host bridge 46. Additionally, the PIC may be its own chip or component on the mother board. A standard chip employed as a PIC is the 8259A or 82C59A PIC chip. However, most computer systems have integrated the 8259A or 82C59A PIC as a functional unit on larger chips in order to reduce the number of components on the mother board. Whether integrated into a larger chip or standing as its own component, the 8259A or 82C59A PIC is still accessible as a programmable interrupt controller on the mother board.

While the above description has been described with some particularity, it is to be understood that the present invention may be used in conjunction with other hardware configurations. For example, other peripheral components such an Ethernet controller, multimedia controller, or Small Computer System Interface II (SCSI II) controller may be added to the PCI bus 60.

Figure 4:
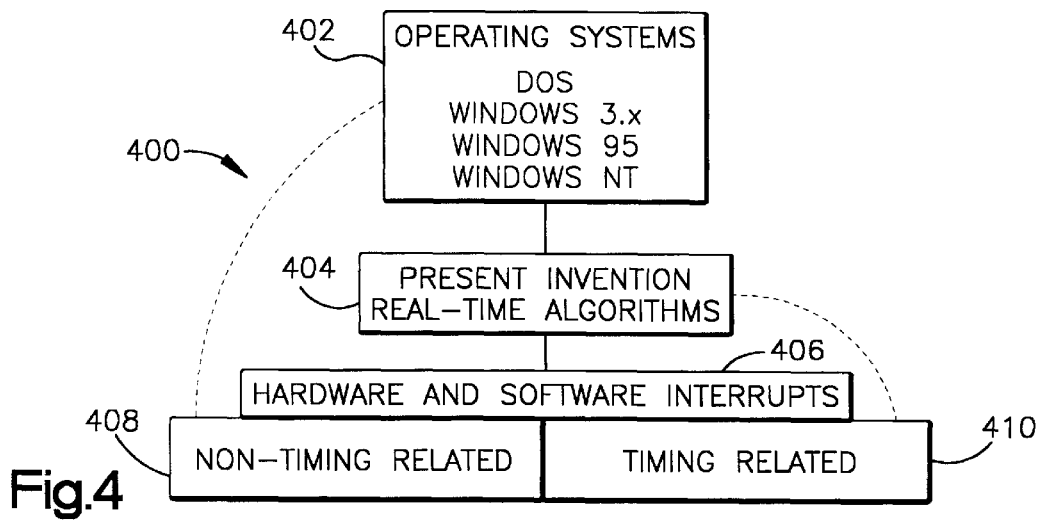
FIG. 4 is a high-level block diagram illustrating hierarchical relationship of the present invention to certain other computer system components.

Referring now to FIG. 4, a high-level block diagram illustrating hierarchical relationship 400 of the present invention to certain other computer system components is shown. In particular, the hierarchical relationship 400 includes an operating system 402, a plurality of real-time algorithms 404 of the present invention and hardware and software interrupts 406. The hardware and software interrupts 406 include non-timing related hardware and software interrupts 408 and timing related hardware and software interrupts 410. The real-time algorithms 404 of the present invention all reside below the operating system 402 and above the hardware and software interrupts 406. The non-timing related hardware and software interrupts 408 are generally handled directly by the operating system 402. The timing related hardware and software interrupts 410 are handled by the real-time algorithms 404 of the present invention without the operating system's 402 knowledge. The real-time algorithms 404 of the present invention generate and employ high frequency interrupts which are utilized to create high resolution clock time slices.

Figure 5:
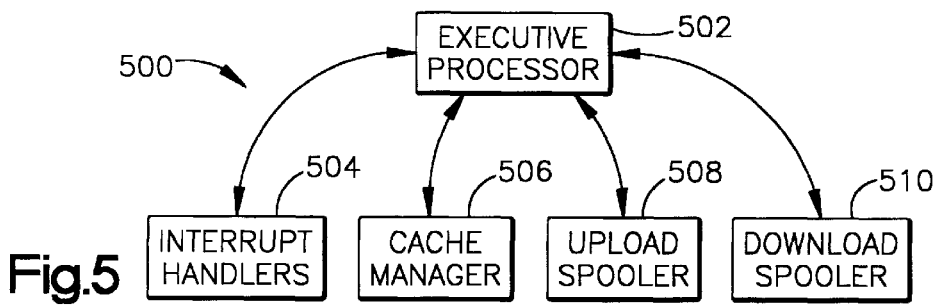
FIG. 5 a high-level block diagram of a communication controller 500 of the present invention and its components.
Figure 10:
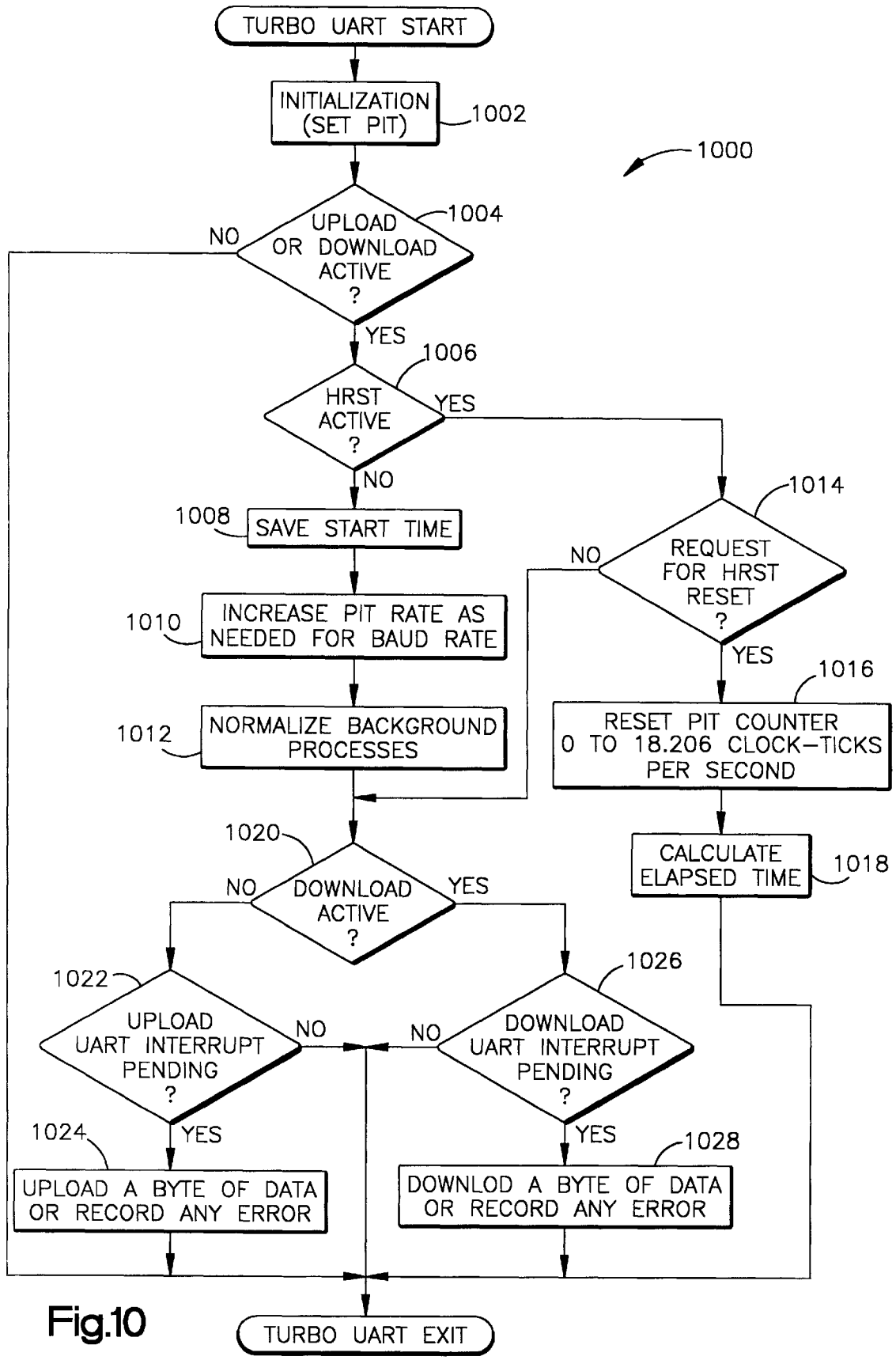
FIG. 10 illustrates logic for a TURBO UART procedure which is part of the executive process

Referring now to FIG. 5, a high-level block diagram of a communication controller 500 and its components is illustrated. More particularly, the communication controller 500 includes an executive processor 502, a plurality of interrupt handlers 504, a cache memory manager 506, a background upload spooler 508 and a background download spooler 510. The executive processor includes 16-bit code that is compatible with the code residing in the Microsoft 16-bit code residing in the DOS and the WINDOWSTM operating system's kernel. The executive processor can be implemented as a multitasking Terminate and Stay Resident (TSR) program. The executive processor 502 is responsible for managing the plurality of interrupt handlers 504, cache memory manager 506, upload spooler 508 and download spooler 510. The executive processor code interfaces with the operating system (i.e. WINDOWSTM) and is responsible for dynamic resource management. FIG. 10, described infra, details a TURBO UART procedure which is part of the executive processor 502.

The interrupt handlers 504 utilize interrupt driven I/O for the computer system's communication ports, such as the RS-232C port by programming the computer system's hardware (i.e. support chips) to generate high resolution clockticks. A clocktick is, broadly speaking, any synchronization signal provided by a clock. The synchronization signal is generally periodic, accurately spaced and used for purposes such as timing, regulation of operations or the generation of interrupts. The executive processor 502 and the interrupt handlers 504 of the present invention dynamically calculate the clocktick resolution required to maintain continuous on-line communication as a function of communication device (e.g. fax/modem) baud rate and computer system hardware. The dynamic clocktick resolution generation is enabled via the 8259 PIC and the 8253/8254 PIT, or their equivalents. Moreover, these same elements are integral in enabling the upload and download background spoolers 508 and 510. The details of the dynamic clocktick resolution calculation are discussed in the text associated with FIGS. 7–10.

The cache memory manager 506 is responsible for dynamic memory allocation and de-allocation requirements. In particular, the cache memory manager 506 dynamically allocates memory (e.g. random access memory, or RAM) for I/O processes, such as uploading or downloading data. The cache memory manager 506 will create an upload memory cache area and a download memory cache area within the cache memory.

The background upload spooler 508 operates at the UART chip level to generate interrupt driven I/O for RS-232C on-line communications. A background spooler is, generally speaking, a program that intercepts data that is being transmitted to a particular device (e.g. fax/modem or printer) and stores it in an auxiliary storage device (e.g. hard disk) as buffer storage in order to reduce processing delays when transferring data between peripheral devices and the processor of a computer system. The data which is intercepted and stored is then later transmitted in the background when the required peripheral device(s) or system resource(s) become available.

Through the generation of interrupt driven I/O, the background upload spooler 508 maintains continuous data transmission at the baud rate selected for the communication device (e.g. modem) by moving data from the upload memory cache area within the minimum time interval (hereinafter MTI) allowed by the UART. The data included in the file to be uploaded is moved, in the background, from first memory location (e.g. hard disk) into the upload memory cache area (second memory location) for transfer via the RS-232C communications port.

The background download spooler 510 also operates at the UART chip level to generate interrupt driven I/O for RS-232C on-line communications. Through the generation of interrupt driven I/O, the background download spooler 510 maintains continuous data retrieval without overrun error by moving data into the download memory cache area within the MTI allowed by the UART. Overrun error is the loss of data caused by a receiving device, such as a modem, that is not able to accept data at the rate the data is being transmitted. The data included in the file to be downloaded is received, in the background, from the RS-232C communications port to the download memory cache area (first memory location) and is eventually moved to a second memory location (e.g. hard disk).

Figure 6:
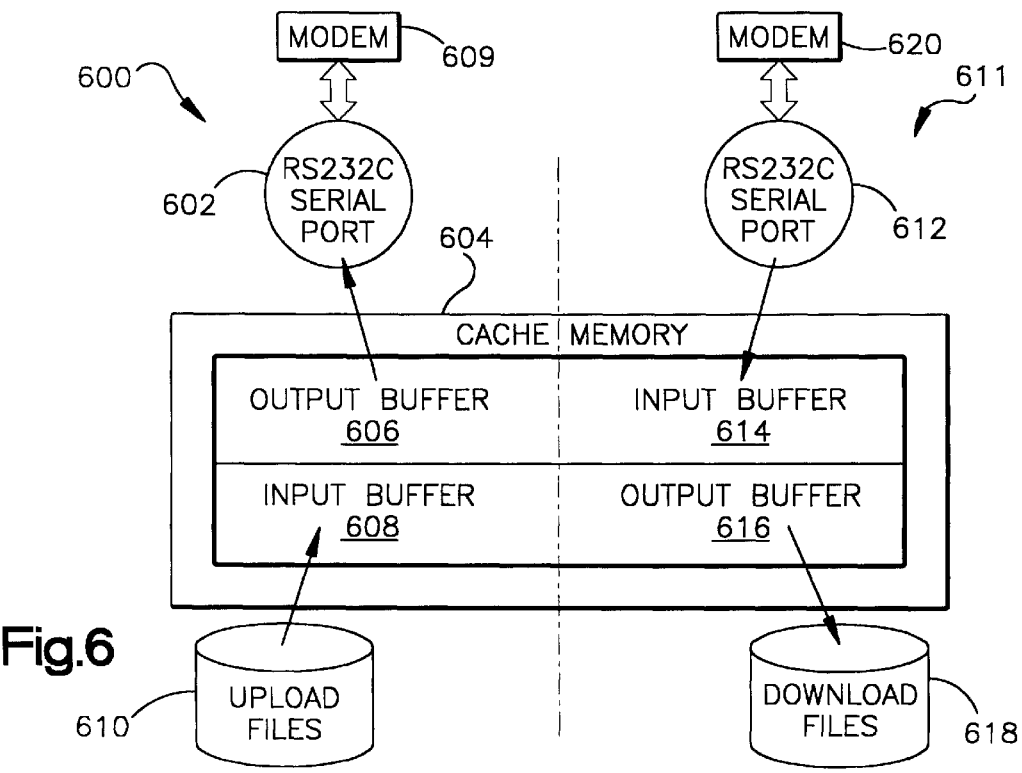
FIG. 6 illustrates the data flow for the upload and download processes of the present invention.

The five major components of the present invention having been generally described, reference is now made to FIG. 6 which illustrates the data flow for the upload and download processes of the present invention that are performed by the background upload and download spoolers 508 and 510 of FIG. 5. The upload process 600 includes a first memory location 610, a second memory location (hereinafter cache memory 604) and a data transmitting RS-232C serial port 610. The cache memory 604 includes an output buffer memory area 606 and an input buffer memory area 608, which collectively form the upload memory cache area.

Tile first memory location 610 includes data or files which have been identified for uploading through the RS-232C communications port and maintains the identified data or files in an upload Queue. Generally, a "queue" is a line or list of items that are waiting to be processed. Therefore, the upload Queue includes data or files that have been identified for uploading. In the first memory location is generally any readable memory and includes a hard disk. CD-ROM, ROM and/or RAM location.

The executive processor 502 (shown in FIG. 5) of the present invention monitors the upload Queue to detect when a file or data has been placed therein and upon such detection, initiates the upload process 600. This monitoring function is accomplished via the interrupt handlers 504 and interrupt driven I/O processing. The transmission of data from the serial port 602 will generate an interrupt which will, in turn, inform the executive processor 502 that data has been transmitted from the serial port 602. If an application is presently running on the computer system, then in the background of a presently running application, the executive processor 502 establishes RS-232C communications with the data receiving computer or fax system and the cache memory manager 506 dynamically allocates the upload memory cache location (input buffer 608 and output buffer 610) in preparation for the data transfer. The cache memory manager 506 employs double buffering (i.e. input buffer 608 and output buffer 606) in the upload memory cache location to facilitate overlapping interrupt driven I/O processing. The executive processor 502, interrupt handlers 504 and background upload spooler 508 utilize the high resolution clocktick technology of the present invention to warrant that the interrupt driven I/O processing responds to all I/O requests during a specified time interval. In the illustrated embodiment, the executive processor 502 can employ a TCP/IP (Transmission Control Protocol/Internet Protocol) file transfer protocol to send packets of data from the upload memory cache location (input buffer 608 and output buffer 606) to the serial port 602 for transmission via a locally connected modem or fax/modem 609.

The download process 611 includes a first memory location (hereinafter cache memory 604), a second memory location 618, and a data receiving RS-232C serial port 618. The cache memory 604 includes an output buffer memory area 616 and an input buffer memory area 614, which collectively form the download memory cache area.

The executive processor 502 (shown in FIG. 5) of the present invention monitors the serial port 612 for reception of data and thereupon, initiates the download process 611. This monitoring function is accomplished via the interrupt handlers 504 and interrupt driven I/O processing. The reception of data at the serial port 612 will generate an interrupt which will, in turn, inform the executive processor 502 that data has been received at the serial port 612. If an application is presently running on the computer system, then in the background of the presently running application the executive processor 502 establishes RS-232C communications with the data transmitting computer or fax system and the cache memory manager 506 dynamically allocates the download memory cache location (input buffer 614 and output buffer 616) in preparation for the data transfer. The cache memory manager 506 employs double buffering (i.e. input buffer 608 and output buffer 606) in the upload memory cache location to facilitate overlapping interrupt driven I/O processing. The executive processor 502, interrupt handlers 504 and background download spooler 510 utilize the high resolution clocktick technology of the present invention to warrant that the interrupt driven I/O processing responds to all I/O requests during a specified time interval. In the illustrated embodiment the executive processor 502 can employ a TCP/IP (Transmission Control Protocol/Internet Protocol) file transfer protocol to receive packets of data from a modem or fax/modem 620 connected the serial port 612 via the download memory cache location (input buffer 614 and output buffer 616) to second memory location 618. The second memory location 618 includes a hard disk drive, write-able CD-ROM, RAM, or their equivalents.

Of particular importance to the present invention is the high resolution clocktick generation logic presented herein and the utilization of the PIT for implementation thereof. To recall, A PIT generates programmable time intervals from an external clock signal of a crystal oscillator on the mother board, which is defined independently from the CPU 42. The PIT employs three independent and programmable counters (0 to 2) which count down from a given value. Particularly, counter 0 is responsible for updating the system clock and, on most personal computer systems, counter 0 is programmed to provide 18.2 clockticks a second. An interrupt #08 h is generated each time counter 0 reaches a count of zero. Additionally, each counter, including counter 0, is programmed to run at the same input clock signal time base of 0.838 $\mu$S, or 1.193181 Mhz, and each counter decrements once for every input clock signal. Additionally, the PIT has several programmable operating modes. By causing Counter 0 to operate in what is typically known as "Mode 2," or as a rate generator, it can be used to generate a Real Time Clock Interrupt. In Mode 2, the PIT counter 0 acts as a standard divide-by-N counter. Divide-by-N counters are well-known in the art and may be generally described as counters that include N states, each of which may be cycled through by the application of an input signal. Additionally, divide-by-N counters cycle back to their initial states, i.e. they are self-resetting and self-repeating. When the PIT counter 0 is programmed with a value of 0, the highest possible value which is equivalent to $2^{16}$ for binary counting or $10^4$ binary-coded decimal counting, it will generate the standard 18.2 clockticks per second.

Figure 7:
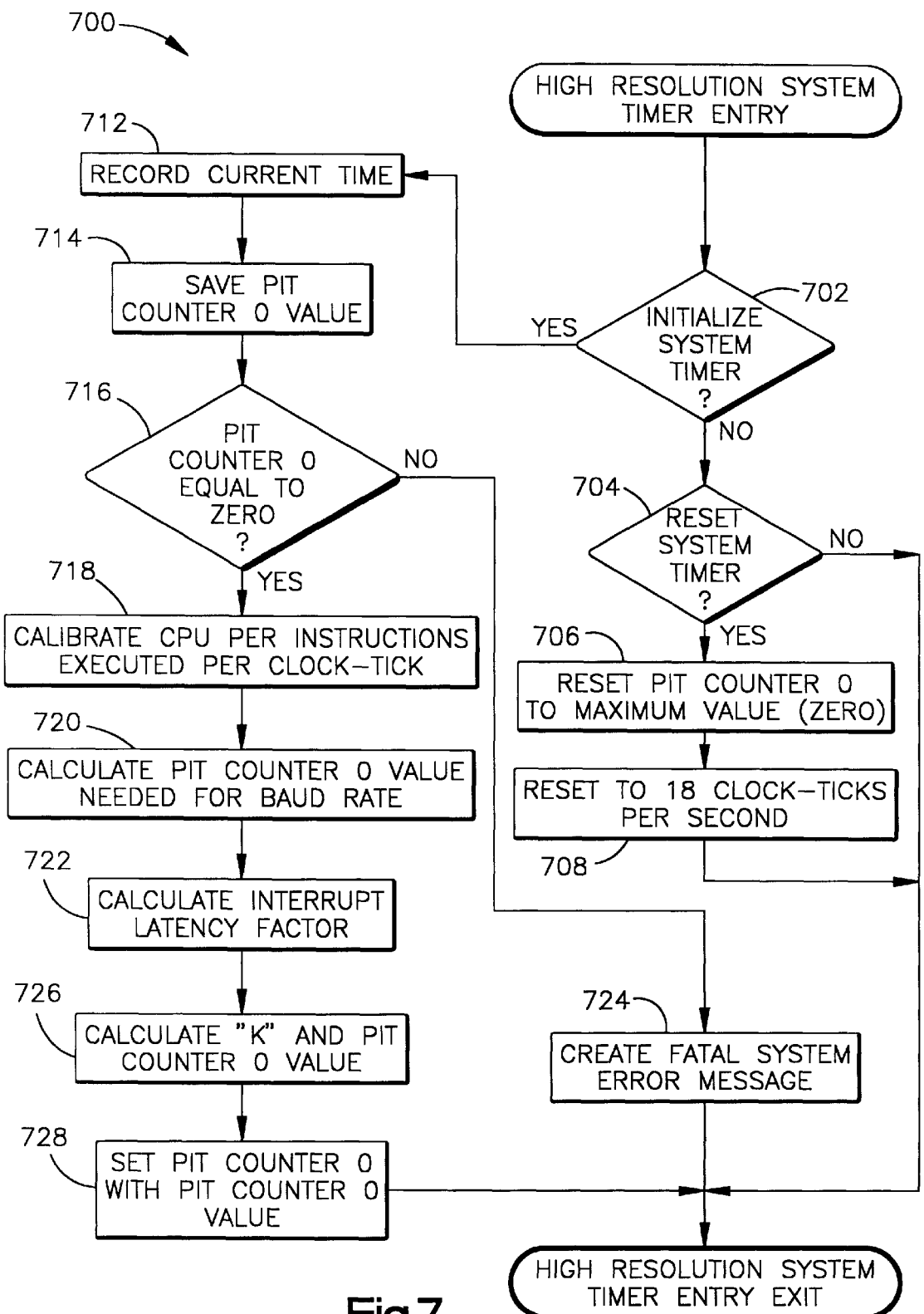
FIG. 7 illustrates the high resolution clocktick generation logic of the present invention.

Referring now to FIG. 7, a high resolution system timer flowchart 700, which illustrates the high resolution clocktick generation logic of the present invention through the programming of the PIT counter 0, is shown. The high resolution system timer (hereinafter HRST) procedure 700 is called by a high/low resolution hardware clock (hereinafter H/L RHC) 900, infra, of the present invention (shown in FIG. 9). The HRST procedure begins at step 702, where it is determined whether the high resolution system timer should be initialized. If initialization is required, then the HRST proceeds to step 712 where initialization begins.

In step 712, the HRST procedure records the current system time. The current system time is, inter alia, a record of the number of expired clockticks the computer system has experienced. The system time is stored for reference and statistical purposes so that the amount of time by which the system timer has been accelerated can be determined. While step 712 is shown in the illustrated embodiment as being part of the HRST procedure 700, it may, alternatively, be performed in other procedures, such as an upload or download procedure or an interrupt handler routine.

After step 712, the HRST procedure proceeds to step 714 where the PIT counter 0 value, is saved. To recall, the PIT counter 0 value determines the resolution of the clockticks. The PIT counter 0 value is saved because other programs, such as a game program, may have already reprogrammed the PIT counter 0. In such a case, the current PIT counter 0 value is stored so that once the HRST procedure and the H/L RHC interrupt handler have completed execution, the PIT counter 0 may be reprogrammed with its previous value. In this manner, the present invention will appear transparent to other applications employing the PIT counter 0. However, it should be noted that just as in the case of step 712, step 714 need not be performed in the HRST procedure 700. Step 714 may, in the alternative, be performed in other procedures, such as an upload or download procedure or an interrupt handler routine.

Following step 714, the HRST procedure advances to step 716. In step 716, the HRST procedure determines whether the saved PIT counter 0 value is equal to zero. As described, supra, when the PIT counter 0 is programmed with 0, it will generate the standard 18.2 clockticks per second. Therefore, when the PIT counter 0 value is not equal to zero, the PIT counter 0 is being utilized by some other procedure or program. In the illustrated embodiment, if the PIT counter 0 value is not equal to zero, then the HRST procedure advances to step 724. In step 724, the HRST procedure generates a fatal system error message because the PIT counter 0 is already being utilized by another program. However, in other embodiments, the HRST procedure could advance to a substitution routine whereby the program employing the PIT counter 0 is made to wait while the HRST procedure and HRHC interrupt handler employ the PIT counter 0.

If, in step 716, the PIT counter 0 value is equal to zero, then the HRST procedure moves to step 718 where a calibration value CPUINDEX is determined. The determination is made by ascertaining the number times a specified test code will execute on the personal computer system within the standard clocktick interval of $\frac{1}{18.2}$ second. In the illustrated embodiment, the test code was executed on an IBM PC AT running at 8 MHz and required 5 $\mu$S to execute once.

Figure 8A:
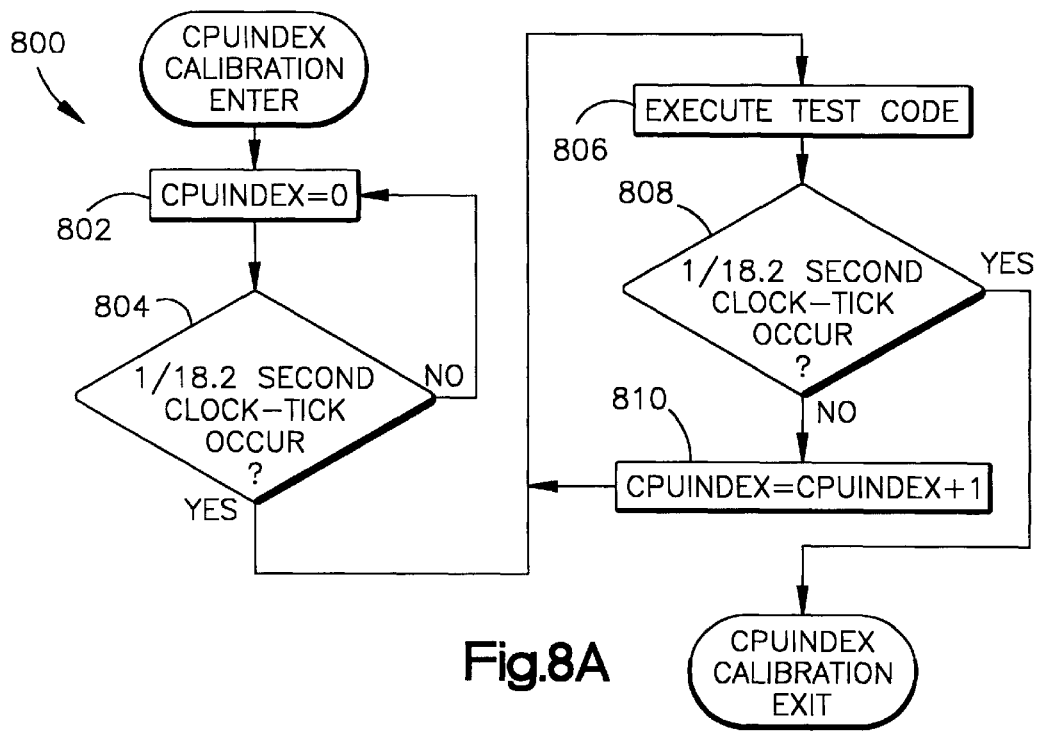
FIG. 8A illustrates the CALIBRATION logic of the present invention where a variable CPUINDEX is determined.

Referring now to FIG. 8A, a CALIBRATION procedure 800 is illustrated. The CALIBRATION procedure starts in step 802 where a variable CPUINDEX is set equal to zero. The variable CPUINDEX keeps track of the number of times the test code has been executed on the personal computer system within the standard clocktick interval of $\frac{1}{18.2}$ seconds. After step 802, the CALIBRATION procedure advances to step 804 where it determines whether a $\frac{1}{18.2}$ second clocktick presently occurred. If a $\frac{1}{18.2}$ second clock has presently occurred, thereby indicating that execution of the test code may commence, the CALIBRATION procedure proceeds to step 806. In step 806, the CPU executes the test code. After step 806, the CALIBRATION procedure advances to step 808 where it determines whether a $\frac{1}{18.2}$ second clocktick has occurred during the execution of the test code in step 806. If a $\frac{1}{18.2}$ second clocktick has occurred during execution of the test code in step 806, then the CALIBRATION procedure exits and the variable CPUINDEX will remain at its current value.

If, however, a $\frac{1}{18.2}$ second clocktick has not occurred during the execution of the test code in step 806, the CALIBRATION procedure advances to step 810. In step 810, the variable CPUINDEX is incremented by a value of 1 to indicate that the test code has executed without the occurrence of a $\frac{1}{18.2}$ second clocktick. After step 810, the CALIBRATION procedure loops back to step 806 where it once again executes the test code. As mentioned, supra, upon completion of step 806, the CALIBRATION procedure determines whether a $\frac{1}{18.2}$ second clocktick has occurred during the execution of the test code in step 806, if not, then the variable CPUINDEX is incremented by one in step 810.

If so, then the CALIBRATION procedure exits. In this manner, the number of times the CPU can execute the test code in step 806 is counted by the variable CPUINDEX.

Moreover, the variable CPUINDEX is an integer which provides a direct indication of how much faster the CPU under test is as compared to the computer system used to established the test code execution time. For example, in the illustrated embodiment, the test code required an execution time of 5 μS on an IBM PC AT running at 8 Mhz. Therefore, if the variable CPUINDEX is equal to a value of 3 when the CALIBRATION procedure is completed, then the presently tested CPU is approximately 3 times faster than the IBM PC AT running at 8 MHz used to establish the 5 μS execution time of the test code. It should be apparent to those skilled in the art that other computer systems, test codes and CALIBRATION procedures may be generated from the procedures described above. For example, step 802 may be incorporated into the execution of the test code in step 808. Therefore, programmer preference and design may produce more of less process steps and still follow the basic logic of the CALIBRATION procedure 800 of the present invention. Table 1 illustrates experimental CPUINDEX values for an IBM PC-AT, Hewlett-Packard VECTRA® and IBM APTIVA® computer.

TABLE 1

Experimental CPUINDEX Values.

| Computer | Speed | CPUINDEX |
| --- | --- | --- |
| IBM PC-AT ® | 6 MHz | 1 |
| Hewlett-Packard VECTRA ® | 33 MHz | 23 |
| IBM APTIVA ® | 166 MHz | 137 |

Referring now to FIG. 7, once the variable CPUINDEX is determined, in step 718, the IIRSr procedure advances to step 720. In step 720, a PIT counter 0 value is determined as a function of a specified UART baud rate. The specified UART baud rate is the baud rate at which the user or computer system has configured the UART to operate. The UART baud rates typically available are, inter alia, 300, 1200, 2400, 4800, 9600, 19200, 38400, 57600 and 115200. In the case of modems, or fax/modems, the UART is generally set to operate at a value equal to the modem's baud rate. Alternatively, the present invention may employ the modem baud rate. The present invention reads the UART baud rate and stores it in a variable for use in the calculation of the PIT counter 0 value, to be presently described. The illustrated embodiment employs a default UART, or modem, baud rate of 28800. Table 2 illustrates the clocktick interval time, in seconds, that is required for servicing of the UART at the specified rate, along with the counter 0 value based thereon, and the appropriate PIT counter 0 value that must be used to guarantee BIOS clock integrity. It should be noted that the PIT counter 0 values displayed in Table 2 are based on the UART baud rate and the BIOS clocktick interval, and thus, are not the final values with which the PIT counter 0 is programmed.

TABLE 2

Clocktick Interval and PIT Counter 0 values based on UART Baud Rate

| BAUD RATE | CLOCKTICK INTERVAL | COUNTER 0 VALUE (BAUD RATE) | PIT COUNTER 0 VALUE |
| --- | --- | --- | --- |
| 300 | 15 ms | 17899 | 16384 |
| 1200 | 8 ms | 9546 | 8192 |
| 2400 | 4 ms | 4773 | 4096 |

TABLE 2-continued

Clocktick Interval and PIT Counter 0 values based on UART Baud Rate

| BAUD RATE | CLOCKTICK INTERVAL | COUNTER 0 VALUE (BAUD RATE) | PIT COUNTER 0 VALUE |
| --- | --- | --- | --- |
| 4800 | 2 ms | 2386 | 2048 |
| 9600 | 1 ms | 1193 | 1024 |
| 11520 | 860 μs | 1026 | 1024 |
| 14400 | 688 μs | 821 | 512 |
| 19200 | 516 μs | 615 | 512 |
| 28800 | 344 μs | 410 | 256 |
| 38400 | 258 μs | 307 | 256 |
| 57600 | 172 μs | 205 | 128 |
| 115200 | 86 μs | 102 | 64 |

After step 720, the HRST procedure advances to step 722 where an interrupt latency factor is determined. The interrupt latency factor is a specified value which can be either determined from a look-up table, or may be determined via a real-time kernel routine that measures interrupt latency. The interrupt latency is measured in seconds (typically nanoseconds) and indicates the delay between when an interrupt is issued and when a "treaded," or a process, which is supposed to process the interrupt is initiated. Interrupt latency tractors typically vary based on, inter alia, the computer system's type of CPU. For more information on interrupt latencies, see "Realtime ETS Kernel Performance Measurements," TNT Embedded Technologies Guidebook, Appendix C, Pharlap Inc. (1995–96). In the illustrated embodiment, the interrupt latency factor may be determined via execution of an interrupt latency procedure shown in FIG. 8B, or from commercially available interrupt latency routines, such as those from Pharlap Inc.

Figure 8C:
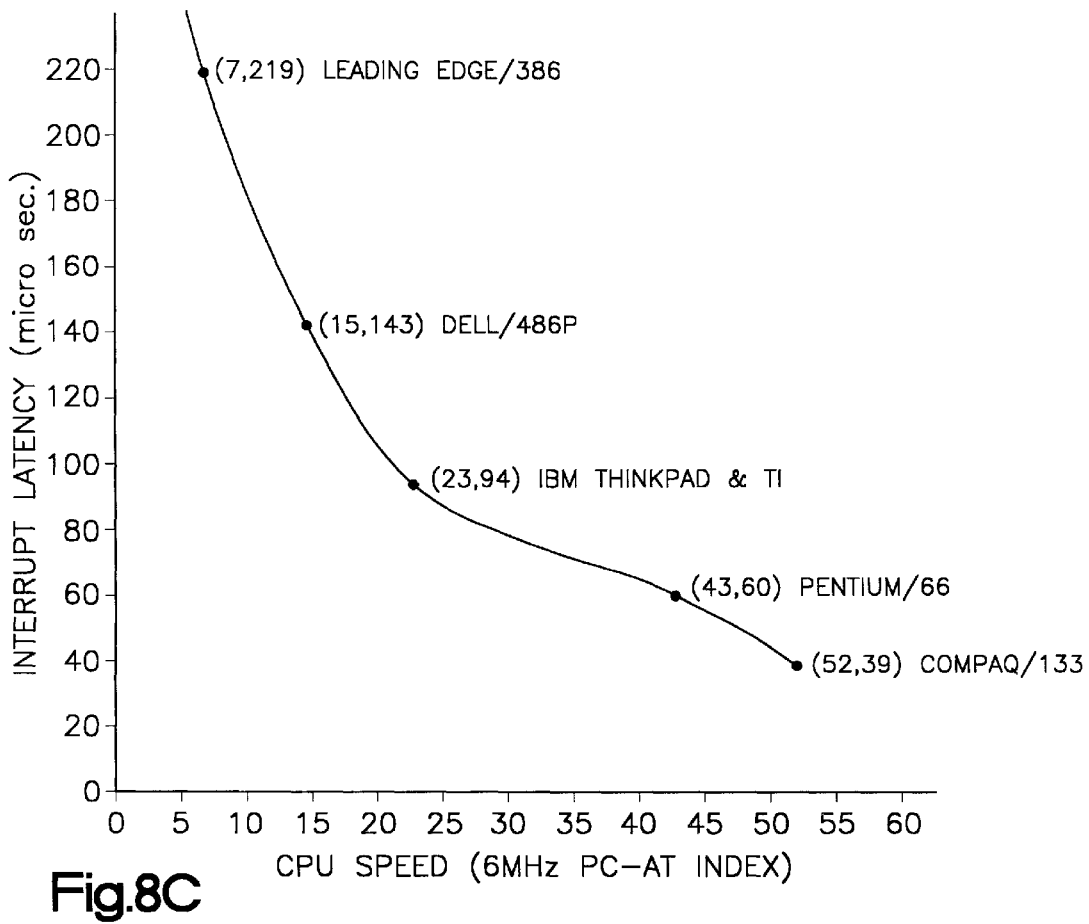
FIG. 8C is a graph showing the worst case interrupt latency values measured against CPU speed.
Figure 8B:
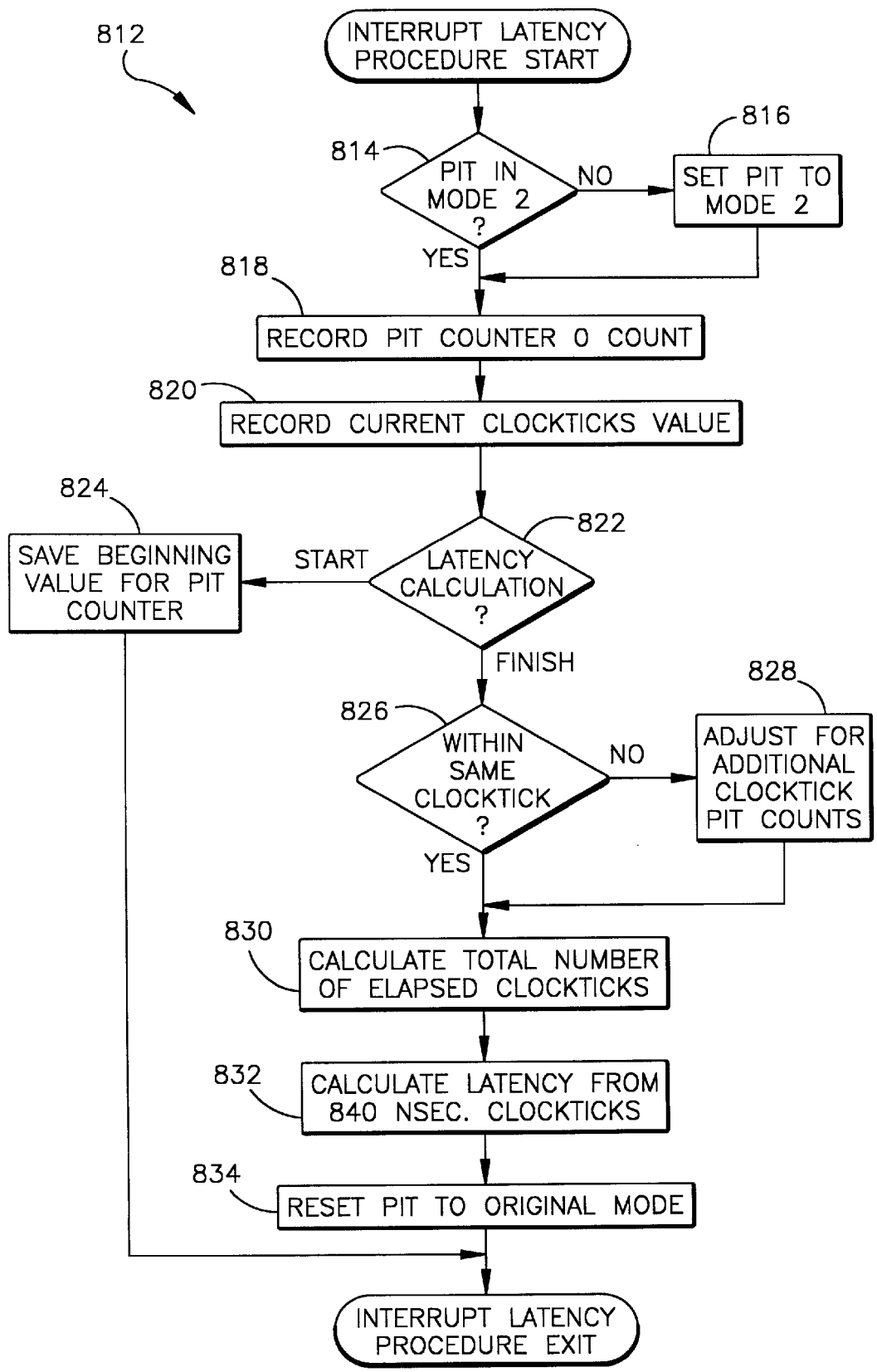
FIG. 8B illustrates logic for an interrupt latency procedure the present invention which determines a CPU's interrupt latency.

Referring now to FIG. 8B, an interrupt latency procedure 812 of the present invention is shown. The procedure begins in step 814 where the PIT is tested to determine whether it is in mode 2. To recall, when the PIT is in mode 2, it acts as a rate generator and generates a real time clock interrupt. If the PIT is not an mode 2, in step 814, the interrupt latency procedure advances to step 816. In step 816, the interrupt latency procedure 812 sets the PIT counter 0 to mode 2. If, in step 814, the PIT is already in mode 2, or after step 816, the interrupt latency procedure 812 advances to step 818.

In step 818, the interrupt latency procedure records the PIT counter 0 count.

After step 818, the interrupt latency procedure 812 advances to step 820 where it records the current clocktick value. After step 820, the interrupt latency procedure proceeds to step 822. In step 822, the interrupt latency procedure 812 tests to determine whether the interrupt latency calculation is being newly initiated, or has already been initiated and is being called upon to complete a previous initiated interrupt latency calculation.

Typically, the interrupt latency procedure 812 is called twice for each determination of an interrupt latency factor. More particularly, in order to determine the interrupt latency factor, the interrupt latency procedure 812 is called once (i.e. initiated) when an interrupt is issued and called a second time (i.e. to complete the previously initiated calculation) after the thread or process, which is supposed to process the interrupt, is initiated. A variable or flag is set to indicate whether an interrupt latency calculation has previously been initiated. Therefore, if in step 822 an interrupt latency calculation is being newly initiated, the interrupt latency procedure 812 advances to step 824. In step 824, the current PIT counter 0 value is stored. The current PIT counter 0 value stored in step 824 will be subsequently employed to determine the interrupt latency factor in step 830. After step 824, the interrupt latency procedure 812 exits.

If in step 822 the interrupt latency procedure 812 determines that an interrupt latency calculation has previously been initiated, the procedure advances to step 826. In step 826, the interrupt latency procedure 812 tests to determine whether the previously initiated interrupt latency calculation was initiated within the same, or current, clocktick. It the previously initiated interrupt latency calculation was not initiated within the same, or current, clocktick, the interrupt latency procedure 812 advances to step 828. In step 828, the interrupt latency procedure 812 examines the PIT counter 0 value to determine the current counter 0 value. After step 828, or if the previously initiated interrupt latency calculation was initiated within the same clocktick in step 822, the interrupt latency procedure 812 advances to step 830 where it calculates the total number of elapsed clockticks. After step 830, the interrupt latency procedure 812 advances to step 832. In step 832, the interrupt latency procedure 812 calculates the interrupt latency based on the minimum PIT time-slice of 838 nanoseconds (or, conversely, the maximum PIT frequency of 1.1931181 MHz). After step 832, the interrupt latency procedure 812 advances to step 834 where the PIT is reset to its original mode. After step 834, the interrupt latency procedure 812 exits.

Illustrated in FIG. 8C is a graph showing the worst case interrupt latency values measured against CPU speed. The CPU speed is based on an index of a 6 MHz IBM PC-AT© computer. FIG. 8C also illustrates the worst case interrupt lution clock tick will always fall on the standard $\frac{1}{18.2}$ of a second clocktick interval.

More specifically, the PIT counter 0 value may be calculated by formula (1):

$$PIT \text{ counter } 0 \text{ value} = \left(\frac{65536}{K}\right) \quad (1)$$

where K is a resolution constant that is an integer value and is determined as a function of the CPUINDEX variable, interrupt latency factor associated with the CPU, and the specified UART baud rate. The denominator of 65536 provides that the PIT counter 0 is programmed with a counter value that results in the high resolution clockticks being multiple proportions of the standard $\frac{1}{18.2}$ of a second clocktick interval. The PIT counter 0 value will fall in a rang,e having an upper limit of 65.536 and a lower limit determined by the computer system hardware (e.g. interrupt latency factor, CPUINDEX and UART or modem baud rate).

The value of the resolution constant K may be determined by either of two methods. The first method involves the determination of the CPUINDEX variable. The CPUINDEX variable is determined from the CALIBRATION procedure 800 of FIG. 8A. Once the CPUINDEX variable is known, the interrupt latency can be determined from the graph of FIG. 8C, or from the following formulas which approximate the same graph:

Interrupt Latency = 726.5 − 72.5(*CPUINDEX*)    where *CPUINDEX* = 1 to 7

Interrupt Latency = 285.5 − 9.5(*CPUINDEX*)    where *CPUINDEX* = 7 to 15

Interrupt Latency = 234.875 − 6.125(*CPUINDEX*)    where *CPUINDEX* = 15 to 23

Interrupt Latency = 133.1 − 1.7(*CPUINDEX*)    where *CPUINDEX* = 23 to 43

Interrupt Latency = 160.334 − 2.334(*CPUINDEX*)    where *CPUINDEX* = 43 to 52 latency values for some common personal computers. These same values are listed in table 3.

TABLE 3

CPU Interrupt Latency (Worst Case)

| CPU | WORST CASE INTERRUPT LATENCY |
|---|---|
| LeadingEdge/386 | 219 μs |
| Dell/486P | 143 μs |
| IBM Thinkpad ® | 94 μs |
| Pentium ® 66 | 60 μs |
| Compaq/133 | 39 μs |

After step 722, the HRST procedure advances to step 726 where a PIT counter 0 value is determined. The PIT counter 0 value is calculated as a function of (1) the standard $\frac{1}{18.2}$ second clocktick interval, (2) the CPUINDEX variable, (3) an interrupt latency factor associated each CPU, and (4) a specified UART baud rate. Of particular importance to the present invention is that the PIT counter 0 is programmed with a count value which will generate high resolution clock ticks which are multiple proportions of the $\frac{1}{18.2}$ second standard clocktick interval. For example, if the PIT counter 0 is programmed to provide four high resolution clockticks, each high resolution clocktick will have occurred at an interval of $(\frac{1}{18.2})/(4) = \frac{1}{72.8}$ seconds. Therefore, a high reso- Once the interrupt latency is determined, an initial resolution constant can be determined by the following formula (3) where the initial resolution constant is an integer:

$$K_1 = \left(\frac{86 \, \mu s}{\text{Interrupt Latency}(\mu s)}\right) \quad (3)$$

This initial resolution constant $K_1$ is then compared to a resolution constant $K_2$ determined from the computer system's UART baud rate (i.e. modem baud rate) by the following formula (4):

$$K_2 = \left(\frac{115{,}200 \text{ bps}}{\text{BAUD RATE}}\right) \quad (4)$$

The final resolution constant K is determined by taking the lower of $K_1$ and $K_2$.

A second method of determining the resolution constant K involves the dynamic determination of the interrupt latency factor. The interrupt latency factor is determined dynamically according to the interrupt latency procedure 812 shown in FIG. 8B and described in the text associated with that figure. Once the interrupt latency factor is determined, an initial resolution constant $K_1$ is determined from formula (3). This initial resolution constant is then compared to a resolution constant $K_2$ determine from the computer system's UART baud rate (i.e. modem baud rate) by formula (4). Once both resolution constants $K_1$ and $K_2$ have been determined, the final resolution constant K is determined by taking the lower of the two values.

Additionally, a safety factor may be added to reduce the resolution constant K by one or more integer values. The need to reduce the resolution constant K by the safety factor SF arises from the fact that identically hardware structured computer systems may not operate at the same speeds. This discrepancy in speed arises from many factors, including hardware chips coming from different manufacturers and hardware chips coming from the same manufacturer but from different manufacturing lots. Therefore, the safety factor SF may be employed to ensure that the calculated resolution constant K is within a range of properly determined values for a given computer system (e.g., 97% of a particular computer system manufacturer's models). While the value of the safety factor SF can be assigned based on values greater than zero, it is more properly determined by a statistical analysis of the resolution constant K of a particular manufacturer's computer system models. Once the PIT counter 0 value is determined and set within the PIT in step 728, the PIT counter 0 will begin generating high resolution clockticks. Accordingly, after step 728, the HRST procedure will exit.

Still referring to FIG. 7, if in step 702 the HRST need not be initialized, then the HRST procedure proceeds to step 704. In step 704, the HRST procedure determines whether the HRST should be reset. The HRST should be reset when, inter alia, the executive processor 502 (shown in FIG. 5) determines that the background process (e.g. an upload or download process, infra) which initiated the HRST procedure has completed. Accordingly, if the HRST should be reset, then the HRST procedure advances to step 706 where the PIT counter 0 value is set to its maximum value of zero to provide the standard 18.2 clockticks per second. However, if another program had reprogrammed the PIT counter 0 to provide a clocktick frequency other than the standard 18.2 clockticks per second, the HRST procedure would reset the PIT counter 0 with this previously saved value (see step 714). Step 708 simply provides that the PIT counter 0 will begin generating 18.2 clockticks per second upon being programmed with a PIT counter 0 value of 0. After step 708, the HRST procedure exits.

Figure 9:
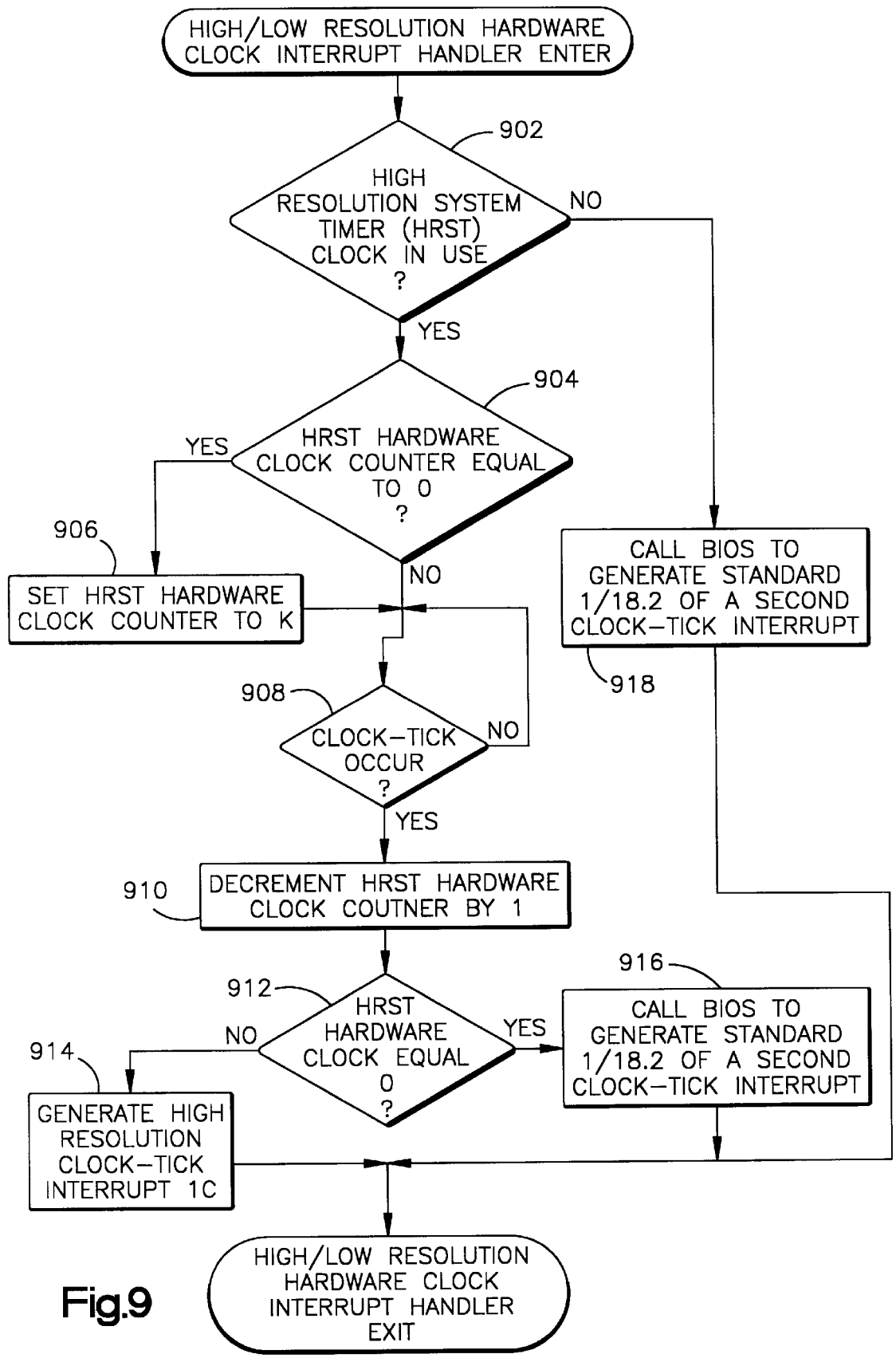
FIG. 9 illustrates logic for a high/low resolution hardware clock interrupt handler of the present invention.

Illustrated in FIG. 9 is a high/low resolution hardware clock (hereinafter H/L RHC) interrupt handler flowchart 900 of the present invention. As described in the text associated with FIGS. 7. 8A and 8B, the pit is dynamically initialized to generate an increased number of clockticks (i.e. hardware clock interrupts) per second in order to achieve high resolution time intervals. Also, as described supra, the standard clocktick rate generated by the BIOS interrupt handler is 18.206 clockticks per second.

upon every PIT counter 0 clock signal, an interrupt will be generated from the PIT and the H/L HRC interrupt handler of the present invention will commence execution. The H/L HRC interrupt handler commences in step 902 where it determines whether the high resolution system timer (HRST) hardware clock is in use. The determination is made via an examination of a HRST status variable which set during utilization of the HRST procedure. Typically, the HRST status variable will include two states. A first state may indicate that the HRST procedure is being utilized and a second state may indicate that the HRST procedure is not being utilized, or vice-versa. Moreover, the HRST status variable may have a plurality of states, each indicating a stage of execution. Such techniques are well-known in the art and will not be discussed presently.

If the HRST hardware clock is not being utilized, the H/L RHC interrupt handler proceeds to step 918. In step 918, a call is made to the BIOS hardware clock interrupt handler to generate a $\frac{1}{18.206}$ of a second clocktick (i.e. standard clocktick rate). After completion of step 918, the H/L RHC interrupt handler exits.

If the HRST hardware clock is being utilized in step 902, the H/L RHC interrupt handler proceeds to step 904. In step 904, the H/L RHC interrupt handler determines if a HRST hardware clock counter is equal to 0. The HRST hardware clock counter's purpose is to count the number of high resolution clockticks generated by the PIT counter 0 so that a determination may be made when the BIOS hardware clock interrupt handler should be called to generate a $\frac{1}{18.206}$ of a second clocktick (i.e. standard clocktick rate). The details of the HRST hardware clock counter counting will be presently discussed.

Accordingly, if the HRSH hardware clock is being, utilized and the HRST hardware clock counter is equal to zero, the H/L RHC interrupt handler proceeds to step 906. In step 906, the HRST hardware clock counter is set to a counter value as a function of the resolution constant K determined, supra. After step 906, the H/L RHC interrupt handler proceeds to step 908 where it determines, via the PIC, whether a (high resolution) clocktick has occurred. If a clocktick not occurred, the H/L RHC interrupt handler remains in step 908 via execution of a loop until a clocktick does occur. Once a clocktick occurs, the H/L RHC interrupt handler proceeds to step 910. In step 910, the HRST hardware clock counter is decremented by a value of 1 to indicate the occurrence of a clocktick. After step 910, the H/L RHC interrupt handler proceeds to step 912 where the HRST hardware clock counter is tested to determine if it is equal to zero. A value of zero indicates that a $\frac{1}{18.206}$ of a second clocktick is required (i.e. standard clocktick rate).

If, in step 912, the HRST hardware clock counter is not equal to zero, then the H/L HRC interrupt handler generates a high resolution hardware clocktick interrupt #1Ch. The interrupt #1Ch is utilized by the CPU for expeditious execution of the background processes (i.e. upload, download, etc. process). After step 914, the H/L HRC interrupt handler exits until the next PIT counter 0 clock signal (i.e. an interrupt #08h).

If, in step 912, the HRST hardware clock counter is equal to zero, then the H/L HRC interrupt handler proceeds to step 916. In step 916, a call is made to the BIOS hardware clock interrupt handler to generate a $\frac{1}{18.206}$ of a second hardware clocktick interrupt #1Ch. The call to the BIOS hardware clock interrupt handler is important to maintain HRST transparency and overall system integrity. After step 916, the H/L RHC interrupt handler exits until the next PIT counter 0 clock signal (i.e. an interrupt #08 h).

Referring now to FIG. 10, a flowchart of a turbo UART procedure 1000 is shown. The turbo UART procedure is initiated by the executive processor 502 (shown in FIG. 5) whenever the executive processor 502 detects data to be transmitted or received. Referring now to FIGS. 5, 6 and 10, in the case of data to be transmitted, the executive processor 502 monitors the upload Queue to detect when a file or data has been placed therein and upon such detection, initiates the upload process 600. This monitoring function is accomplished via the interrupt handlers 504 and interrupt driven I/O processing. The transmission of data from the serial port 602 will generate an interrupt which will, in turn, inform the executive processor 502 that data has been transmitted from the UART via the serial port 602. In the case of data to be received, the executive processor 502 monitors the serial port 612 for reception of data and thereupon, initiates the download process 611. This monitoring function is accomplished via the interrupt handlers 504 and interrupt driven I/O processing. The reception of data at the serial port 612 will cause the UART to venerate an interrupt which will, in turn, inform the executive processor 502 that data has been received via the serial port 612 in the UART.

More particularly, the TURBO UART procedure 1000 starts in step 1002, where the PIT Counter 0 set by the methods previously described and shown. After step 1002, the TURBO UART procedure advances to step 1004. In step 1004, the executive processor tests to determine whether an upload or download is currently active. To briefly recall, the executive processor monitors the upload and Download background spoolers 508 and 510 respectively. If an upload or download is not currently active in step 1004, then the TURBO UART procedure exits until the next clocktick. If, however, an upload or download is active in step 1004, then the TURBO UART procedure advances to step 1006.

In step 1006, the TURBO UART procedure 1000 tests to determine whether the HRST (High Resolution System Timer) is active. If the HRST is not active in step 1006, then the TURBO UART procedure 1000 advances to step 1008. In step 1008, the TURBO UART procedure 1000 saves the system start time for statistical and time management purposes. After step 1008, the TURBO UART procedure 1000 advances to step 1010 where the PIT clock frequency is dynamically adjusted to ensure that the computer system is operating at its optimal level and/or that the background processes (e.g., writing data to or reading data from a disk) are not impacting any foreground processes. The dynamic adjustment, or reconfiguration, of the PIT clock frequency, in step 1010, is performed based on a plurality of factors including mouse, keyboard, video and disk activity. The present invention uses statistical data to monitor the above activities and based thereon, reconfigure the PIT clock frequency so that it is at or near its optimal operating frequency given the computer systems current state of operations. In certain cases, this reconfiguration may result in faster or slower PIT clock frequencies.

After step 1010, the TURBO UART procedure 1000 advances to step 1012 where all background processes are normalized to the standard clocktick rate of 18.206 clockticks/second. This step is performed because in most cases, the background processes are not required to execute at higher clock frequencies than the standard clocktick rate. For example, the present invention employs double buffering in the cache 604 (See FIG. 6). The process of reading data from the disk 610 to the cache 604, or the process of writing data from the cache 604 to the disk 618, does not have to execute at the high resolution clocktick frequency rate. Under normal operating circumstances, the standard clocktick rate is sufficient. However, other circumstances, may necessitate the se of the high resolution clocktick frequency.

After step 1012, the TURBO UART procedure 1000 advances to step 1020. In step 1020, the procedure tests to determine whether a download is active. If a download is active, the TURBO UART procedure advances to step 1026. In step 1026, the procedure tests to determine whether a download UART interrupt is pending. To recall, the UART can generate an interrupt to indicate that it includes data in its buffers. If a download UART interrupt is pending, then the TURBO UART procedure proceeds to step 1028 where it downloads a byte of data into the cache memory or it records any error messages. If there is no download UART interrupt pending, then the TURBO UART procedure exits.

If in step 1020, there is no download active, the TURBO UART procedure advances to step 1022. In step 1022, the procedure tests to determine whether an upload UART interrupt is pending. If an upload UART interrupt is pending, the procedure advances to step 1024 where a byte of data is transferred to the UART from cache memory for uploading. If there is no upload UART interrupt pending, the TURBO UART procedure exits.

If, in step 1006, the HRST is active, the TURBO UART procedure advances to step 1014. In step 1014, the procedure tests to determine whether a request for resetting the HRST has been issued. The request for reset may be generated by, for example, a reset of the computer operating system. If a request for reset has not been requested, the TURBO UART procedure advances to step 1020. If a request for reset has been requested, the TURBO UART procedure advances to step 1016. In step 1016, the PIT clock is reset to generate the standard clocktick rate of 18.206 clockticks/second. After step 1016, the TURBO UART procedure advances to step 1018 where the elapsed time is calculated and the system timer is checked and corrected, if necessary, to indicate the proper elapsed time.

Figure 11:
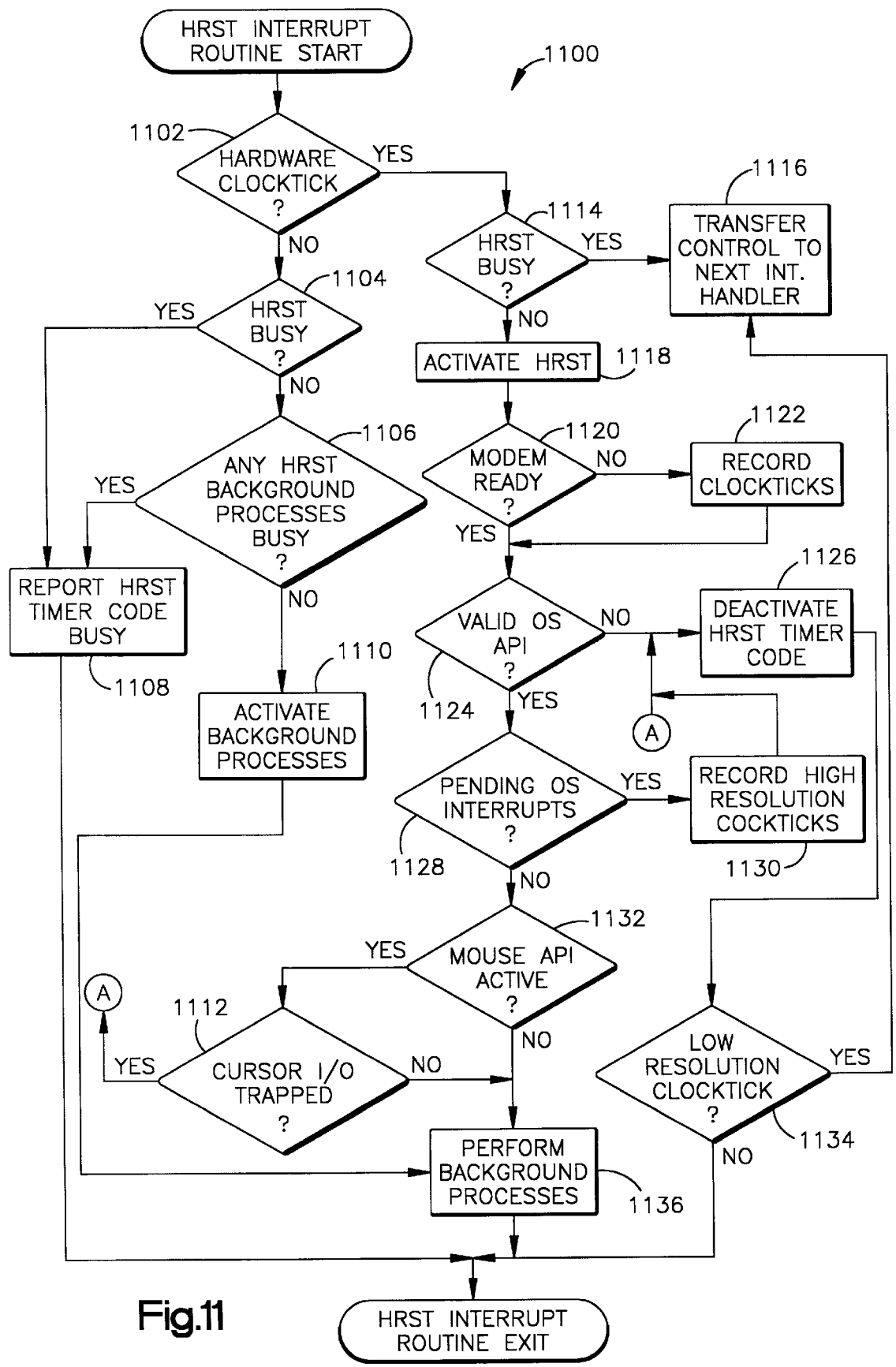
FIG. 11 illustrates logic for a HRST interrupt routine of the present invention.

Referring now to FIG. 11, an HRST interrupt routine 1100 is shown. The HRST interrupt routine 1100 is called from step 914 of FIG. 9. The routine begins in step 1102 where it tests to determined whether a hardware clocktick interrupt has been issued i.e. #08h). If a hardware clocktick interrupt has not been issued, the HRST routine advances to step 1104. In step 1104, the HRST routine tests to determine whether the HRST is already executing by examining which interrupts are pending and which have been serviced.

If, in step 1104, a UART interrupt (e.g. signifying an upload or download process) is pending and has not been serviced, the HRST interrupt routine advances to step 1106. In step 1106, the HRST interrupt routine tests to determine whether any background processes (i.e. upload or download) are currently executing. If there are background processes executing, then the HRST interrupt routine advances to step 1108. In step 1108, the HRST interrupt routine reports to the operating system that the HRST is currently busy. After step 1108, the HRST interrupt routine exits. However, if in step 1106 there are no background processes executing, then the HRST interrupt routine advances to step 1110 where any pending interrupts which can be serviced via a background process are activated. After step 1110, the HRST interrupt routine advances to step 1136 where the activated background processes are executed. After step 1136, the HRST interrupt routine exits. If, however, in step 1104 the HRST is currently executing, then the HRST interrupt routine advances to step 1108 where it reports to the operating system that the HRST is currently busy.

If, however, in step 1102 a hardware clocktick interrupt (i.e. #08h) has been issued, the HRST interrupt routine advances to step 1114. In step 1114, the HRST routine tests to determine whether the HRST is already executing by examining which interrupts are pending and which have been serviced. If the HRST is currently busy, or executing, then the HRST interrupt routine advances to step 1116 where it transfers control to the next interrupt handler. If however, the HRST is not currently busy, or executing, then the HRST interrupt routine advances to step 1118 where the HRST is activated. After step 1118, the HRST interrupt routine advances to step 1120 where it tests to determine whether a modem device is ready for data transfer. If the modem device is not ready, then the HRST interrupt routine advances to step 1122 where the number of clockticks occurring until the modem device is ready is determined. After step 1122, or if the modem device was ready in step 1120, the HRST interrupt routine advances to step 1124 where it tests to determine whether a valid operating system application program interface has been established.

If a valid operating system application program interface has been established, in step 1124, then the HRST interrupt routine advances to step 1128. In step 1128, the HRST interrupt routine tests to determine whether there are any opening operating system interrupts. If there are no pending operating system interrupts, the HRST interrupt routine advances to step 1132 where it tests to determine whether a mouse input device application program interface is active. If the mouse device application program interface is active, the HRST interrupt routine advances to step 1112 where it tests to determine to whether the mouse cursor I/O is trapped. If the mouse cursor I/O is trapped, the HRST interrupt routine advances to step 1126 where the HRST is deactivated. After step 1126, the HRST interrupt routine advances to step 1134 where it tests to determine whether a low resolution clocktick (i.e. the standard 1/18.206 second clocktick) has occurred. If a low resolution clocktick has occurred, or should be issued, then the HRST interrupt routine advances to step 1116 where control is transferred to the next interrupt handler routine (i.e. the BIOS clocktick interrupt handler routine.) If a low resolution clocktick has not occurred, or should not be currently issued, the HRST interrupt routine exits. If, however, the mouse cursor I/O is not trapped in step 1112, the HRST interrupt routine advances to step 1136 where the background processes are performed.

If, in step 1132, the mouse device application program is not active, the HRST interrupt routine advances to step 1136 where the background processes are performed.

After step 1136, the HRST interrupt routine exits. Additionally, if in step 1124, a valid operating system application program interface has not been established, then the HRST interrupt routine advances to steps 1126 and 1134 where the HRST is deactivated and the routine tests to determine whether a low resolution clocktick has, or should, occur. After step 1134, the HRST routine exits.

Referring now to FIGS. 3 and 6, it should be apparent to those skilled in the art that the present invention may be applicable to any computer components which transfer data. More particularly, the present invention has been described above with relation to a communications scheme including, inter alia, modem devices, UART's, cache memories and hard disk memories. The present invention may also be applied to data transmissions between "internal" computer components such as the keyboard mouse controller 84 and memory and the CPU 42 and memory 48; the video controller 66 and the CPU 42 and the video-ram 70; the audio controller 88 and the CPU 42 and memory 48; and other combinations of devices. Still further, the present invention may be applied between "external" devices and the computer system, such as between CCD cameras and the computer system and data acquisition equipment and the computer system. Additionally, applications such as CAD/CAM, full motion video, sound wave audio and games will benefit from the aforementioned. These applications would involve the same or similar to procedures and steps as described for the illustrated embodiment.

Additionally, it will be apparent to those skilled in the art that the present invention may be implemented on an integrated circuit (i.e. hardware). A hardware implementation of the present invention provides the advantage of allowing custom circuit assemblies, such as modem cards, video cards, sound cards, etc. to execute the logic directly from within their sub-assemblies. Moreover, the logic of the present invention may also be integrated into a chip which performs UART functions, especially where the UART chip has the ability to perform direct memory transfers. Additionally, in multi-processor environments (i.e. DSP and CPU), each processor may have access to the logic of the present invention.

While the present invention has been illustrated by the description of embodiments thereof, and while the embodiments have been described in considerable detail, it is not the intention of application to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from Such details without departing from the spirit or scope of the applicant's general inventive concept.

We claim:

1. A method of transmitting or receiving data to or from a computer, the method comprising the steps of:
    (a) reconfiguring a clock to generate clockticks at a frequency which is based upon a computer's particular hardware structure upon the initiation of a transmission or reception of data to or from the computer and
    (b) transmitting or receiving, data based on the clocktick frequency.

2. The method of claim 1 wherein the step of reconfiguring a clock to generate clockticks at a frequency which is based upon a computer's particular hardware structure upon the initiation of a transmission or reception of data to or from the computer comprises the step of determining a resolution constant.

3. The method of claim 2 wherein the step of determining a resolution constant comprises the step of determining a CPU index that indicates the speed of a CPU relative to a predetermined value.

4. The method of claim 2 wherein the step of determining a resolution constant comprises the step of determining an interrupt latency factor that indicates the delay between when an interrupt is issued to a CPU and when an operation which is supposed to process the hardware interrupt is initiated.

5. The method of claim 2 wherein the step of determining a resolution constant comprises the step of determining a UART baud rate that indicates the data transmission and reception settings of the UART.

6. The method of claim 2 wherein the step of determining a resolution constant comprises the step of determining a resolution constant based on a safety factor.

7. The method of claim 2 wherein the step of reconfiguring a clock to generate clockticks at a frequency which is based upon a computer's particular hardware structure upon the initiation of a transmission or reception of data to or from the computer further comprises the step of generating a clock counter value which is based on the resolution constant.

8. The method of claim 3 wherein the step of determining a CPU index that indicates the speed of a CPU relative to a predetermined value comprises the steps of:
    (a) upon the occurrence of a first clocktick, initiating the execution of a test process; and
    (b) counting the number of clockticks that have occurred subsequent to the occurrence of the first clocktick and during the execution of the test process.

9. A method of transmitting or receiving data between components of a computer system, the method comprising the steps of
    (a) reconfiguring a clock to generate clockticks at a frequency which is based upon the components data transmission and reception rates upon the execution of a data transmission or reception instruction and (b) transmitting or receiving data between the components based on the clocktick frequency.

10. The method of claim 9 wherein the step of reconfiguring a clock to generate clockticks at a frequency which is based upon the components data transmission and reception rates upon the execution of a data transmission or reception instruction comprises the step of determining a resolution constant.

11. The method of claim 10 wherein the step of determining a resolution constant comprises the step of determining a CPU index that indicates the actual speed of a CPU relative to a predetermined value.

12. The method of claim 10 wherein the step of determining a resolution constant comprises the step of determining an interrupt latency factor that indicates the delay between when a hardware interrupt is issued to a CPU and when an operation which is supposed to process the hardware interrupt is initiated.

13. The method of claim 10 wherein the step of determining a resolution constant includes the step of determining the components' data transmission and reception rates.

14. The method of claim 10 wherein the step of determining a resolution constant comprises the step of determining, a resolution constant based on a safety factor.

15. A computer system comprising:

(a) a hardware structure comprising:

(1) a CPU, (2) input/output devices for receiving and transmitting data;

(3) a programmable clock for generating a clock frequency by which the computer system operates; and (b) logic for reconfiguring the programmable clock to generate clockticks at a frequency which is based upon the computer system hardware structure and wherein the reconfiguration is initiated upon a transmission or reception of data within the computer system.

16. The computer system of claim 15 wherein the logic for reconfiguring the programmable clock to generate clockticks at a frequency which is based upon the computer system hardware structure and wherein the reconfiguration is initiated upon a transmission or reception of data within the computer system comprises logic for determining a resolution constant.

17. The computer system of claim 16 wherein the logic determining a resolution constant includes logic for determining a CPU index that indicates the speed of a CPU relative to a predetermined value.

18. The computer system of claim 16 wherein the logic determining a resolution constant includes logic for determining an interrupt latency factor that indicates the delay between when an interrupt is issued to a CPU and when an operation which is supposed to process the hardware interrupt is initiated.

19. The computer system of claim 16 wherein the logic determining a resolution constant includes logic for determining a resolution constant based on a safety factor.

* * * * *